United States Patent [19]

Banigan et al.

[11] 4,209,539

[45] Jun. 24, 1980

[54] DETOXIFICATION OF BOTANICAL FOODSTUFFS

[75] Inventors: Thomas F. Banigan, Arcadia; Anthony J. Verbiscar, Sierra Madre, both of Calif.

[73] Assignee: Anver Bioscience Design, Inc., Sierra Madre, Calif.

[21] Appl. No.: 950,688

[22] Filed: Oct. 12, 1978

[51] Int. Cl.² .................................................. A23B 9/00
[52] U.S. Cl. .................................... 426/319; 426/622; 426/629; 426/630; 426/635
[53] Field of Search ............... 426/319, 615, 630, 635, 426/629, 622

[56] References Cited

U.S. PATENT DOCUMENTS 3,919,432  11/1975  Elliger et al. .................... 426/630 X

OTHER PUBLICATIONS

F. B. Wells, "Cereal Chemistry", 32:157 (1955).
C. A. Elliger, A. C. Waiss & R. E. Lundin, J. Chem. Soc., Perk. Trans., I(19):2209 (1973).
A. N. Booth, C. A. Elliger & A. C. Waiss, Life Sci., 15:1115 (1974).
B. Radziszewski; Ber., 17:1289 (1884).
J. V. Murray & J. B. Cloke, J. Am. Chem. Soc., 56:2749 (1934).
K. B. Wiberg, J. Am. Chem. Soc., 77:2519 (1955).
K. B. Wiberg, J. Am. Chem. Soc., 75:3961 (1953).
G. B. Payne & P. H. Williams, J. Org. Chem.; 26:651 (1961).

*Primary Examiner*—Arthur D. Kellogg
*Attorney, Agent, or Firm*—Mason, Kolehmainen, Rathburn & Wyss

[57] ABSTRACT

Cyano (—CN) groups or radicals in natural food products contribute to toxicity of the food in animals and humans. It is desirable to remove such cyano groups from food materials. This can be done by treating such food products with aqueous ammoniacal hydrogen peroxide, which converts the cyano groups to innocuous amide (—COCH$_2$) or other groups or radicals. This treatment can be conducted at ambient temperatures (0° to 50° C.) and is extremely fast compared to ammonia alone or hydrogen peroxide alone, the latter being ineffective.

10 Claims, 1 Drawing Figure

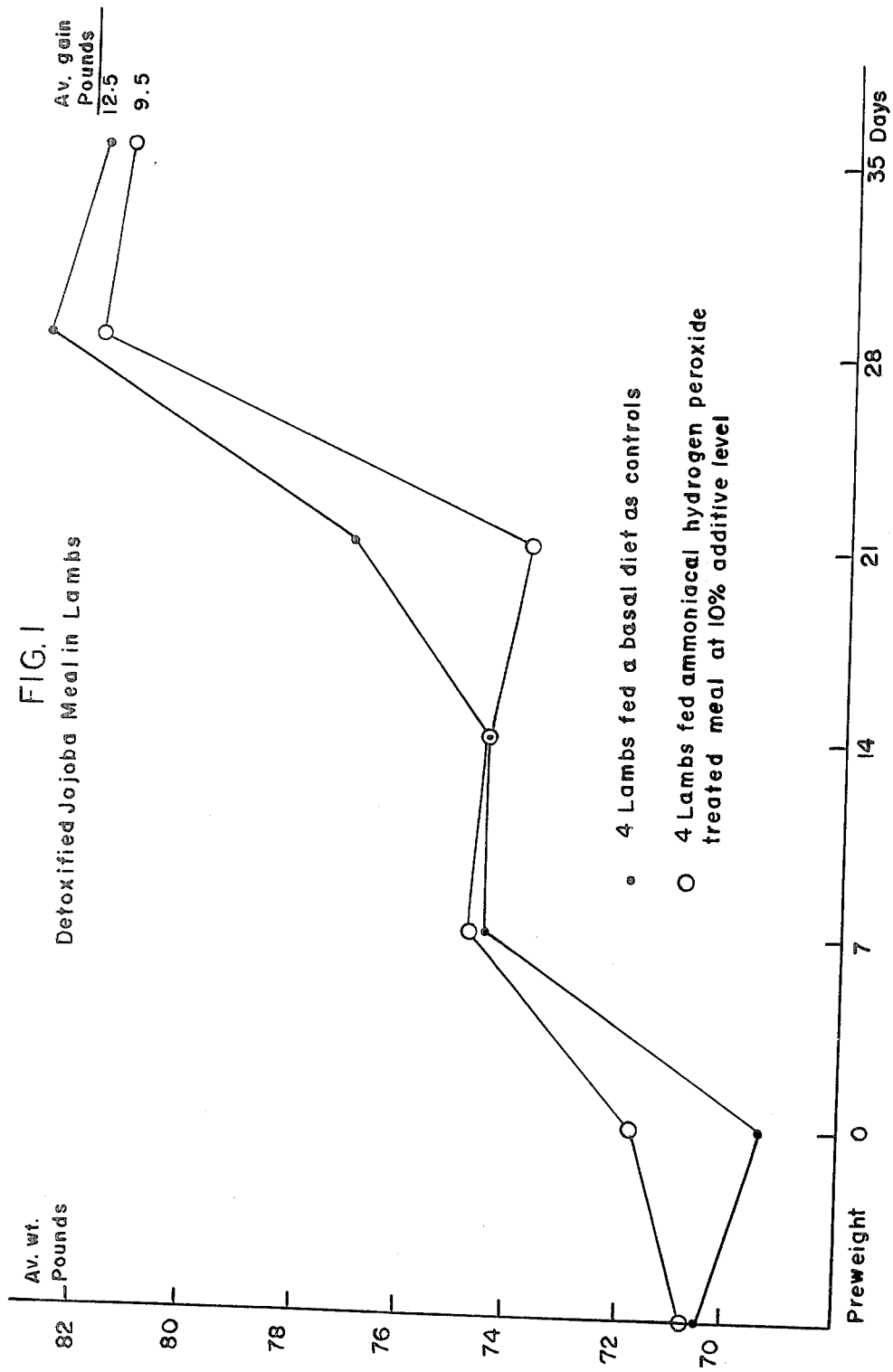

DETOXIFICATION OF BOTANICAL FOODSTUFFS

FIELD OF THE INVENTION

This invention relates to the detoxification of botanical foodstuffs. More particularly it relates to the conversion of toxic cyano groups in compounds which occur in plant materials into innocuous amide or other groups.

BACKGROUND OF THE INVENTION

A wide variety of plants contain compounds with cyano groups which contribute to the toxicity of the plant material for food or feed use. Some of these compounds, termed cyanogenic glycosides, exert their toxicity by releasing hydrogen cyanide upon acidic or enzymatic hydrolysis. An example of a cyanogenic glycoside is amygdalin, or mandelonitrile beta-gentiobioside, which occurs in Rosaceae seeds including peach, bitter almonds, apricot, apple, cherry, pear, plum and quince. Another common cyanogenic glycoside is linamarin, acetone cyanohydrin beta-D-glucoside, which is sometimes referred to as phaseolunatin. Linamarin occurs in cassava from which tapioca is made, many varieties of lima beans, linseed, white clover and many species of Lotus, all of which are plants eaten by humans or domestic animals. Cyanogenic glycosides have been reported to occur in common edible plants including sorghum, black-eyed pea, garden pea, yam, maize and cashew nuts. There are about twenty known cyanogenic glycosides which occur in plants. In addition to amygdalin and linamarin there is prunasin, dhurrin, vicianin, taxiphyllin, lotaustralin, sambunigrin, acacipitalin, zierin and triglochinin.

Cyanide compounds other than cyanogenic glycosides also occur in plant materials. Lathyrism is a neurological disease that affects animals and humans who eat lathyrus peas, a small drought-resistant high protein legume grown as a food in India. Toxicity in Lathyrus is due to beta-N-(gamma-L-glutamyl) aminopropionitrile. Simmondsin, 2-(cyanomethylene)-3-hydroxy-4,5-dimethoxycyclohexyl-beta-D-glucoside occurs in seeds, hulls, leaves, twigs and roots of jojoba, a plant that is grazed by various animals in the wild in the Southwestern United States.

Jojoba, *Simmondsia chinensis*, is a bushy plant that grows well in the arid lands of Arizona, California and Mexico where it is being cultivated as a plantation crop. The seeds contain about 50% by weight of an oil which is chemically and physically similar to sperm whale oil, a raw material no longer available in the United States. Jojoba oil has physical characteristics that are of value for certain commercial products.

Jojoba meal is the plant material remaining after jojoba seeds containing some hulls have been commercially pressed and/or solvent extracted to remove jojoba oil. Jojoba seed meal is the material remaining after deoiling completely dehulled seeds. Deoiled jojoba seed meal contains about 30% crude protein and 8% metabolizeable carbohydrate, which make it a potential feed ingredient for livestock. Even the seed hulls contain 7% crude protein and 3% metabolizeable carbohydrate. The problem is that jojoba meal also contains approximately 4.5% simmondsin, 1% simmondsin 2'-ferulate and at least two other minor toxicants that are structurally related to simmondsin. Simmondsin is an antinutritional factor which even at 0.15% levels in a normal ration causes rats to reduce their food intake. Although acute toxicity of simmondsin is very low, repeated daily doses to rodents lead to weight loss and eventual death. The toxicity of simmondsin is related to its cyano functional group, either as part of the simmondsin structure or more likely as a metabolic degradation product. Removal of simmondsin and the related cyanomethylenecyclohexyl glucosides from the meal, or chemical modification of their cyano groups, substantially eliminates meal toxicity.

The cyano group is chemically modified in meals treated with ammoniacal hydrogen peroxide, and the meals can be used as an additive in animal feed. The methods described here detoxify jojoba meal by hydrating the cyano group of simmondsin. In an aqueous solution of pure simmondsin, ammoniacal hydrogen peroxide hydrates the cyano group quickly and quantitatively to an amide.

The hydration of cyano groups to amides with alkaline hydrogen peroxide is known as the Radziszewski reaction. Early investigations of this reaction have shown that hydration of a cyano function to an amide with hydrogen peroxide in base can be 10,000 times faster than with hydroxyl ion alone.

Hydrogen peroxide alone is ineffective in this hydration. Cinnamonitrile and acrylonitrile have been converted to amides by Radziszewski reaction conditions.

The Radziszewski reaction is carried out in solution, usually water, using alkali bases such as sodium hydroxide. Aqueous treatment of jojoba meal leads to an unfilterable mass as the meal absorbs several times its weight of water. Also, base causes hydrolysis of the glycoside linkage of simmondsin resulting in the formation of 2-hydroxy-3-methoxybenzyl cyanide, a compound that is more toxic than simmondsin. Normal Radziszewski reaction conditions are, therefore, undesirable for treating jojoba meal.

GENERAL DESCRIPTION OF THE INVENTION

Successful application of the hydration reaction to water-moistened jojoba meal requires a volatile base along with hydrogen peroxide for an even distribution of reagents throughout the meal. Ammonia was selected for this purpose although it has not been reported previously in this reaction. When dilute ammonium hydroxide and hydrogen peroxide are mixed there is no exotherm and the reagent is stable for a while at least. The reagent can then be sprayed evenly on the meal as it is tumbled or agitated in some manner.

Ammoniacal hydrogen peroxide sprayed on deoiled jojoba meal substantially modified simmondsin within two days. After 40 hours simmondsin levels were reduced from an initial 4.5% to 0.19%. As a comparison, treatment of jojoba meal with ammonia alone in a closed container reduced simmondsin levels to 0.16% after 40 days. This ammonia treatment also hydrates the cyano group, and has been described in Elliger et al. U.S. Pat. No. 3,919,432.

An advantage in using ammoniacal hydrogen peroxide rather than ammonia alone is the much shorter treatment time required for equivalent detoxification, Table I. Ammoniacal hydrogen peroxide treatment requires about one week in a closed container compared to five or six weeks for the ammonia process. After these treatments excess ammonia evaporated leaving a nutritionally acceptable meal for animals.

Mouse feeding studies on some selected detoxified jojoba meals are reported in Table II. The data indicate that mortality is related to the levels of simmondsin and other structurally related toxicants in the meal. The acetone extracted meal with toxicant level of 0.68% showed highest mortality. Meal H115 which resulted after treatment with ammonia and *Lactobacillus bulgaricus,* the yogurt bacterium, contained 0.48% toxicants with 20% mortality in 3 weeks. The methylene chloride:methanol (85:15) extracted meal with 0.38% toxicants caused a 10% mortality in these weanling mice in 3 weeks. The ammonia treated meal H64 was comparable to the ammoniacal hydrogen peroxide treated meal H112. All of these meals were added as sole source protein to otherwise normal mouse diets. When ammoniacal hydrogen peroxide treated meal J21 was added to a normal mouse diet at a 10% level, a growth of the mice and feed intake was better.

Poultry feeding studies are summarized in Table III. In these studies performance of broiler chicks fed non-detoxified J1 and detoxified J21 jojoba meals are compared with performance of chicks on a standard commercial diet. Although the chicks ate J1 meal they did not grow well. At 5% levels one of the eighteen chicks died and at 10% levels ten chicks died within four weeks. In comparison, chicks on J21 meal did as well as controls at 5% additive levels. Performance on J21 meal at 10% levels fell off because of low methionine and lysine levels in jojoba seed meal protein, a common deficiency in plant proteins.

The non-detoxified jojoba meal J1 was fed at a 10% additive level in a basal diet to 4 lambs averaging 46 lbs. each initially. The lambs did not eat well and after 35 days the average gain per lamb was 1.2 lbs. One lamb did so poorly that it was removed from the experiment after 14 days. In comparison, 4 control lambs averaging 53 lbs. each initially gained an average of 17.3 lbs. after 35 days on the basal diet.

Four lambs were fed ammoniacal hydrogen peroxide treated jojoba meal containing 0.8% simmondsin and 0.09% simmondsin 2'-ferulate at 10% level in a basal diet for 35 days, as shown in FIG. 1. Feed consumed per pound of gain was 12.9 lbs. with an average gain of 9.5 lbs. The four controls on a basal diet consumed 10.2 lbs. of feed per pound of gain with an average gain of 12.5 lbs. Statistically the performance of these lambs in the two groups are comparable.

Ammoniacal hydrogen peroxide is a new and novel reagent for converting the toxicants in jojoba meal, namely simmondsin and related cyano compounds, to the corresponding amides or other structures. Simmondsin amide has been detected in extracts of ammoniacal hydrogen peroxide treated meal using high performance liquid chromatography. Jojoba meal treated with this reagent is non-toxic and an acceptable feed additive for livestock.

Ammoniacal hydrogen peroxide reagent also works well on other cyano containing compounds converting these to the corresponding amide. For example, we treated a methanolic solution of amygdalin with ammoniacal hydrogen peroxide and within one hour it was completely converted to its amide analog. When de-oiled peach seed meal was treated with this reagent the amygdalin reacted in the meal and was undetectable after 40 hours. This indicates that our process may be usefully applied to the preparation of marzipan, a baking and confectionary product. Marzipan is made from almonds and apricot seeds which contain amygdalin. In the commercial preparation of Marzipan the amygdalin in these seeds is degraded to hydrogen cyanide and benzaldehyde by soaking the meal in water which allows the natural enzymes in the seed to cleave the glycoside linkage. Steam distillation is then used to remove the hydrogen cyanide and undesirable benzaldehyde. This ammoniacal hydrogen peroxide reagent would provide a simpler and far more economical process for marzipan preparation than the traditional method described here.

Another immediate application of our process is in the detoxification of cassava, a staple food item throughout the tropics. Linamarin is the principal toxicant in cassava. Tapioca, a product of cassava sold in the United States, may still contain some linamarin. Linamarin also occurs in linseed meal which can only be used in limited quantities as a feed for livestock.

There are numerous possible adaptations of the ammoniacal hydrogen peroxide process to food and feed products. Low cost and relative ease of application of the reagents, their non-toxicity and ease of removal from the plant material are advantages in this process.

DETAILED DESCRIPTION OF THE INVENTION

For each molar equivalent of cyano group in the botanical product, two moles of hydrogen peroxide (as 3% to 80% aqueous hydrogen peroxide) react rapidly to hydrate the cyano group to an amide group. In treatment of vegetable meal containing cyano groups, additional hydrogen peroxide may be desirable to compensate for that absorbed or decomposed by the meal. Excess hydrogen peroxide evaporates or decomposes without affecting the product. Sufficient ammonia, usually in the form of aqueous ammonium hydroxide solution, of 1% to 35% concentration, is added to adjust the pH of the mixture to greater than 7.0, usually 7.2–8.5, preferably to 7.5–8. Higher pH values up to 10 are operative but usually inefficient, although excess ammonia retained in the meal is a valuable nitrogen source in ruminant feed. The hydration reaction is very fast at room temperature; the cyano group of simmondsin or amygdalin disappears in less than an hour. In plant meals the reaction is slower but simmondsin and amygdalin in them can be hydrated in a few hours. Simmondsin 2'-ferulate reacts more slowly and several days may be required for disappearance of the cyano group. By experiment it has been found that a minimum of 1.25 grams of hydrogen peroxide is needed to remove the cyano content of 100 grams of jojoba meal containing 7% simmondsin.

The invention is disclosed in further detail by the following examples which are illustrative of various operating conditions. It will be understood that numerous variations in operating procedures and botanical materials may be made within the scope of the invention claimed herein.

EXAMPLE 1

Ammoniacal Hydrogen Peroxide Treatment Of Jojoba Meal

In this example a solution of 0.5 mole of hydrogen peroxide and 1.2 mols of ammonium hydroxide in a total of 350 ml of water was sprayed onto 600 grams of ground deoiled jojoba meal. The meal was contained in a one gallon, wide mouthed bottle which was rotated on a laboratory tumbler and cooled intermittently over a 1.5 hour addition period. The closed bottle was allowed to stand at ambient temperature with occasional tumbling. After 8 days the meal was dried at 65° to a total weight of 617 grams. Analysis by liquid chromatography showed very low levels of simmondsin and simmondsin 2'-ferulate in the meal, H112. This was tested in mice as a sole source protein at a 21.6% addition level, Table II. The meal showed no toxicity after 3 weeks feeding.

EXAMPLE 2

In this scaled-up example a solution of 10 moles of hydrogen peroxide and 10 moles of ammonium hydroxide in a total of 7.94 liters of water was sprayed onto 13.62 kg (30 lbs.) of ground deoiled jojoba meal. The meal was divided into 3×10-lb. portions, each contained in a 5-gallon glass bottle. As before, the reagent was sprayed evenly over the surface of the meal rotating in the bottles, with external cooling over the several hour addition period. The stoppered bottles were then allowed to stand undisturbed at room temperature for 7 days. The meal, J21, was tray dried at 75°–80°, analyzed for toxicants and other meal components, and fed to mice at a 10% additive level, Table II. Poultry data on J21 meal are summarized in Table III.

EXAMPLE 3

Ammonia Treatment

The ammonia-processed meal, H64, was prepared according to Elliger et al. U.S. Pat. No. 3,919,432. Meal was distributed between several quart size mason jars and wetted with ammonium hydroxide. The sealed mason jars were allowed to stand at ambient temperature. After 40 days the meal was dried in an oven to constant weight, analyzed and tested as a sole source protein in a mouse diet, Table II.

EXAMPLE 4

Treatment Of Simmondsin With Ammoniacal Hydrogen Peroxide

A solution of 500 mg of simmondsin hydrate in 10 ml of distilled water was treated with 1.5 ml of 30% hydrogen peroxide and 1.25 ml of ammonium hydroxide solution containing 29% ammonia. After one hour standing at room temperature a thin layer chromatography monitor of the reaction solution showed only a trace of simmondsin and the appearance of a substantial quantity of slower moving compound. After two hours all of the simmondsin had reacted. Water was removed under vacuum on a rotary evaporator, adding ethanol and evaporating several times to remove last traces of solvent. The glassy material was worked up with methyl ethyl ketone giving a white crystalline solid, 440 mg, that was extremely hygroscopic. An infrared spectrum in a nujol mull showed very strong broad absorption due to OH, no CN absorption in the 2200 cm$^{-1}$ region, strong peaks at 1670 cm$^{-1}$ and 1640 cm$^{-1}$ due to -CONH$_2$ and medium absorption at 1600 cm$^{-1}$ probably due to C=C. An infrared spectrum in methanol showed a strong amide peak at 1650 cm$^{-1}$ and a strong shoulder at 1620 cm$^{-1}$. A thin layer chromatogram on Merck silica gel G using (7:5) ethyl acetate; ethanol developer, with both iodine vapor and sulfuric acid charring detection indicated that this product was 90–95% pure, with an R$_f$0.31 compared to R$_f$0.60 for simmondsin. A liquid chromatogram was run on a 3.2×250 mm column packed with Lichrosorb Si 60 using (97:3) acetonitrile:2-methoxyethanol eluant at a 1.0 ml/min flow rate, measuring absorption at 220 nm. Under these conditions simmondsin has a retention time of 6.3 min compared to 31.8 min for this amide.

EXAMPLE 5

Treatment Of Amygdalin With Ammoniacal Hydrogen Peroxide

A solution of 200 mg of amygdalin (mandelonitrile beta-gentiobioside) in 20 ml of methanol was treated with 0.5 ml of 30% hydrogen peroxide and 0.4 ml of ammonium hydroxide containing 29% ammonia. After one hour a thin layer chromatogram of the reaction solution indicated that all of the amygdalin had reacted, as a new spot appeared. The solvent was removed under vacuum on a rotary evaporator leaving a hygroscopic white solid. An infrared spectrum of the solid showed no absorption due to cyano group (nitrile) and strong amide absorption at 1600 cm$^{-1}$. A thin layer chromatogram on Merck silica gel G with ethyl acetate;ethanol (7:5) developer and iodine vapor detection indicated this amide analog of amygdalin to be essentially homogeneous with an R$_f$0.39 compared to amygdalin R$_f$0.68.

EXAMPLE 6

Treatment Of Peach Seed Meal With Ammoniacal Hydrogen Peroxide

A 10 gram sample of dry, ground peach seeds was extracted with hexane to yield 3.79 grams of clear orange oil and 5.73 grams of dry peach seed meal. By thin layer chromatography, the amygdalin content of this meal was determined to be 1%, using acetone to extract the amygdalin from the meal.

A solution of 0.2 ml of ammonium hydroxide containing 29% ammonia and 0.2 ml of 30% hydrogen peroxide in 2 ml of water was mixed thoroughly with 2.78 grams of the dry deoiled meal. After standing 40 hours at ambient temperature in a stoppered bottle the contents were dried at 70° for 90 minutes and assayed for amygdalin by thin layer chromatography. Using iodine vapor detection and 10% sulfuric acid charring no amygdalin could be detected on the chromatogram. The dry recovered meal weighed 2.72 grams.

EXAMPLE 7

Treatment Of Linamarin With Ammoniacal Hydrogen Peroxide

A solution of 100 mg of linamarin (acetone cyanohydrin beta-D-glucoside) in 10 ml of methanol was treated with 0.4 ml of 30% hydrogen peroxide and 0.3 ml of ammonium hydroxide containing 29% ammonia. After standing one hour at room temperature all of the linamarin had reacted as monitored by a thin layer chromatogram. Removal of the solvent under vacuum left a clear colorless gum that crystallized overnight. Workup of this solid in acetone, in which it is only slightly soluble, resulted in the isolation of 65 mg of the amide analog of linamarin. An infrared spectrum showed no absorption due to cyano group but strong amide absorption in the 1600 cm$^{-1}$ region. A TLC on Merck silica gel G using ethyl acetate;ethanol (7:5) developer and iodine vapor and/or sulfuric acid spray with heat detection revealed this product to be essentially homogeneous with an R$_f$0.72 compared with linamarin R$_f$0.86.

Table I

Jojoba Metal Detoxification By Treatment With Ammonium Hydroxide And Hydrogen Peroxide

| | H64 | H112 | J21 |
|---|---|---|---|
| Material/Process | | | |
| Meal, Kg | 0.715 | 0.600 | 13.62 |
| Water total, liters | 0.150 | 0.350 | 7.94 |
| NH$_4$OH, moles | 2.4 | 1.2 | 10 |
| H$_2$O$_2$, moles | 0 | 0.5 | 10 |
| Treatment time, days | 40 | 8 | 7 |
| Temperature | ambient | ambient | ambient |
| Yield, Kg. | 0.730 | 0.617 | 13.35 |
| Assay, % | | | |
| Moisture | 9.0 | 9.5 | 7.9 |
| Crude Protein | 37.0 | 32.4 | 32.8 |
| Hexane extractable | 0.6 | 0.9 | 0.7 |
| Fiber | 10.4 | 8.9 | 10.3 |
| Ash | 4.9 | 4.1 | 3.5 |
| Simmondsin | 0.16 | <0.01 | 0.05 |
| Simmondsin-2'-ferulate | 0.08 | 0.03 | trace |

Table II

Mouse Feeding Studies

| Meal | Meal Composition | | | Meal in Diet, % | Weeks | Body wt., gm | Feed intake/ day, gm | Mortality |
|---|---|---|---|---|---|---|---|---|
| | 1% | 11% | Protein, % | | | | | |
| H35[a] | 0.63 | 0.05 | 31.3 | 22.4 | 1 | 6.8 | 1.7 | 0 |
| | | | | | 2 | 6.2 | 0.9 | 15 |
| | | | | | 3 | 6.1 | 0.9 | 60 |
| H43[b] | 0.33 | 0.05 | 33.5 | 22.4 | 1 | 7.4 | 2.0 | 0 |
| | | | | | 2 | 7.4 | 1.6 | 0 |
| | | | | | 3 | 7.3 | 1.3 | 10 |
| H115[c] | 0.20 | 0.28 | 35.4 | 19.8 | 1 | 6.9 | 2.1 | 0 |
| | | | | | 2 | 6.3 | 1.3 | 0 |
| | | | | | 3 | 6.1 | 0.9 | 20 |
| H64 | 0.16 | 0.08 | 37.0 | 18.9 | 1 | 6.8 | 1.8 | 0 |
| | | | | | 2 | 6.1 | 1.3 | 0 |
| | | | | | 3 | 6.0 | 1.0 | 0 |
| H112 | <0.01 | 0.03 | 32.4 | 21.6 | 1 | 6.6 | 1.7 | 0 |
| | | | | | 2 | 6.2 | 1.4 | 0 |
| | | | | | 3 | 6.0 | 0.9 | 0 |
| J21 | 0.05 | trace | 32.8 | 10 | 1 | 9.1 | 2.3 | 0 |
| | | | | | 2 | 10.3 | 2.8 | 0 |
| | | | | | 3 | 11.7 | 3.0 | 0 |

[a]Extracted several times with acetone
[b]Extracted several times with methylene chloride:methanol (85:15)
[c]Treated with ammonia and *Lactobacillus bulgaricus* for 16 days

Table III

Poultry Feeding Studies

| Meal | Meal in Diet, %[d] | Body wt. at 4 weeks, grams[e] | Grams Feed/ Grams Gain | Feed Consumed/ Bird, grams | Mortality % |
|---|---|---|---|---|---|
| Control[a] | 0 | 720 | 1.55 | 1055 | 0 |
| J1[b] | 5 | 574 | 1.73 | 921 | 5.6 |
| J1 | 10 | 140 | 2.73 | 270 | 55.6 |
| J21[c] | 5 | 720 | 1.59 | 1078 | 0 |
| J21 | 10 | 536 | 1.93 | 954 | 0 |

[a]Commerical basal diet
[b]Non-detoxified jojoba meal containing simmondsin 4.23% and simmondsin 2'ferulate 0.5%
[c]Ammoniacal hydrogen peroxide detoxified jojoba meal
[d]Jojoba meal as % of total diet with substitutions to maintain diet isonitrogenous
[e]Broiler chicks, Hubbard variety, 9 males and 9 females per treatment in 3 pens

We claim:

1. Method of detoxifying feed by removing cyano groups from a botanical material which comprises contacting said material with at least two moles of aqueous hydrogen peroxide per mole of cyano equivalent in said material with sufficient ammonia to adjust the pH of the system to greater than 7.0.

2. Method of claim 1 wherein the botanical is dried and ground to a meal.

3. Method of claim 1 in which the ammonia is in the form of aqueous ammonia of 1% to 35% (w/w) concentration.

4. Method of claim 1 wherein the hydrogen peroxide is in the form of aqueous hydrogen peroxide of 3% to 80% (w/w) concentration.

5. Method of claims 3 and 4 wherein the operation is conducted at a temperature from 0° to 50° C.

6. Method of claim 5 wherein the botanical material is deoiled jojoba meal.

7. Method of claim 5 wherein the botanical material is cassava.

8. Method of claim 5 wherein the botanical material is peach seed meal.

9. Method of claim 5 wherein the botanical material is amygdalin.

10. Method of claim 5 wherein the botanical material is linamarin.

* * * * *